Figure 1:
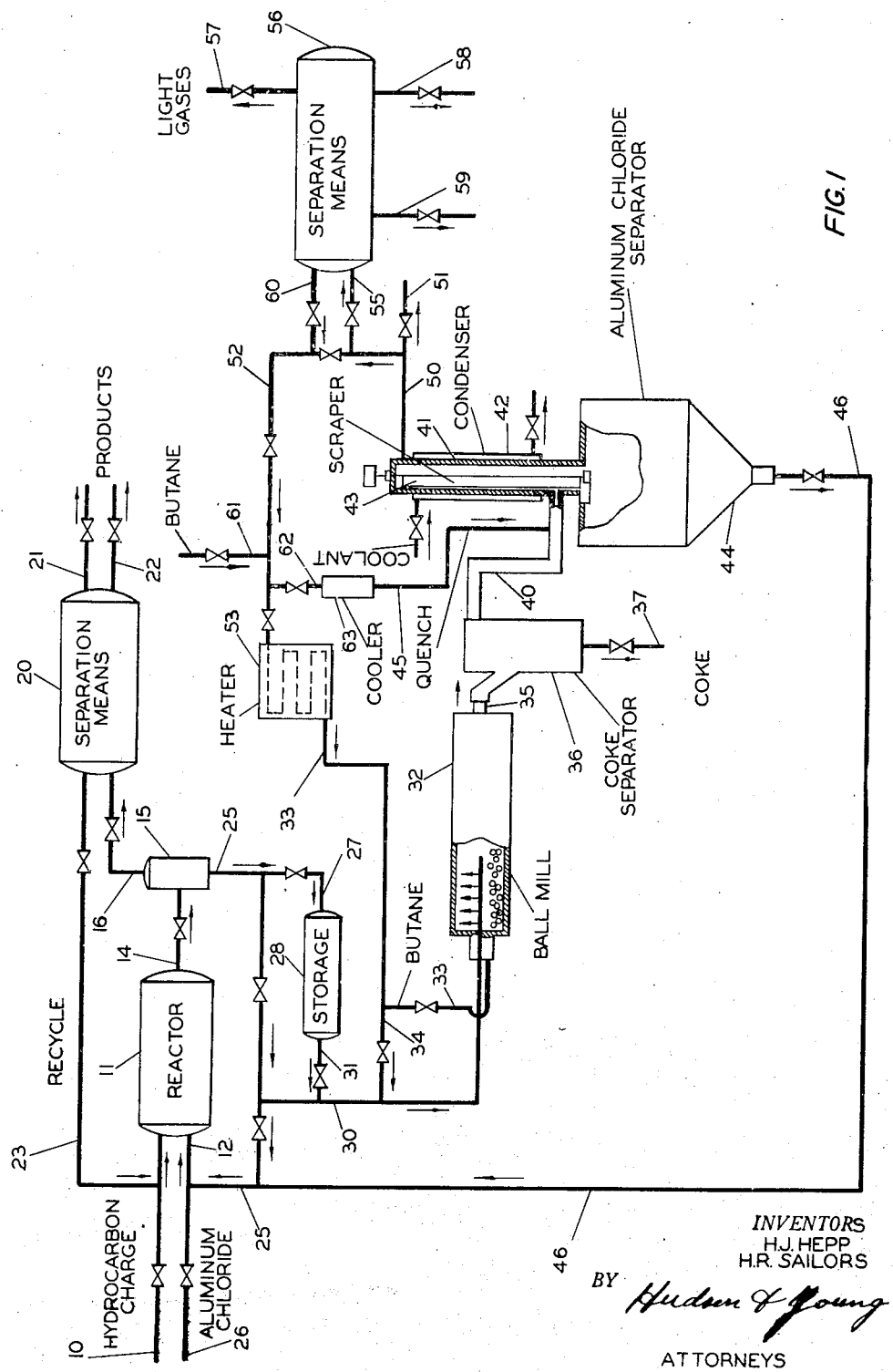

Oct. 18, 1949.　　　H. J. HEPP ET AL　　　2,485,050
RECOVERY OF METAL HALIDES
Filed March 4, 1946　　　　　　　　　　2 Sheets-Sheet 2

INVENTORS
H.J.HEPP
H.R.SAILORS
BY Hudson & Young
ATTORNEYS

Patented Oct. 18, 1949

2,485,050

UNITED STATES PATENT OFFICE 2,485,050

RECOVERY OF METAL HALIDES

Harold J. Hepp and Howard R. Sailors, Bartlesville, Okla., assignors to Phillips Petroleum Company, a corporation of Delaware Application March 4, 1946, Serial No. 651,962

4 Claims. (Cl. 23—96)

This invention relates to the recovery of volatile metal halide of the Friedel-Crafts type from liquid organic materials containing the same. In a more specific embodiment, it relates to the recovery of a relatively volatile aluminum halide from a liquid catalytic material formed by admixing and/or reacting such an aluminum halide with a hydrocarbon material. In the embodiment in which this invention finds its widest present-day use, our invention relates to the recovery of aluminum chloride from a hydrocarbon-aluminum chloride complex such as used in alkylation or isomerization of hydrocarbons.

Aluminum halide catalysts have been used in numerous processes for the conversion of hydrocarbons, including decomposition or cracking of high-boiling hydrocarbons, isomerization of low-boiling hydrocarbons, and alkylation of alkylatable hydrocarbons, including isoparaffins, normal paraffins, cycloparaffins, and aromatic hydrocarbons. In such processes these catalysts have been used as such, suspended in or dissolved in a reaction mixture, suspended on solid supports such as active carbon, activated alumina or aluminous materials such as bauxite, active silica, and various clays such as fuller's earth, kieselguhr, etc., and as separate liquids in the form of complexes with organic and inorganic compounds. The more useful of the liquid complexes are those formed with paraffinic hydrocarbons, especially those formed with more or less highly branched, normally liquid paraffin hydrocarbons boiling in the boiling ranges of those fractions generally identified as gasoline and kerosene. In most instances it is desirable to have present a small amount of a hydrogen halide, sometimes only about 0.1 to about 1 to 5 per cent by weight. This material may be present as a result of side reactions, such as when water is present in a charge stock, when an organic halogen compound is present in a charge stock, when some inter-reaction between an aluminum halide and hydrocarbon takes place, or when a hydrogen halide is deliberately added. Since it is substantially impossible to effect complete dehydration of all equipment and materials, especially in a commercial process, conversions with aluminum halide catalysts are often conducted without the knowledge or appreciation that minor amounts of a hydrogen halide are present.

Liquid hydrocarbon-aluminum halide catalysts are generally prepared by reacting a relatively pure and substantially anhydrous aluminum halide with a paraffin hydrocarbon, or paraffinic hydrocarbon fraction, at a temperature between about 150 and about 230° F. Usually, but not always, it is desirable to effect the production of the catalyst by adding during its formation a small amount of a hydrogen halide and to mix vigorously the hydrocarbon and aluminum halide until the resulting complex contains in combination from about 40 to about 70 per cent by weight of aluminum halide. Satisfactory fluid complexes have been prepared from a variety of paraffin hydrocarbons including normal heptane, isooctane, a paraffinic alkylate fraction resulting from reaction of isobutane and butylenes, and boiling above 350° F., an olefinic polymer fraction boiling in the upper part of the gasoline range, and kerosene. An essential requirement for the preparation of a good catalyst appears to be the use of a sufficiently powerful mixing to maintain the aluminum halide and the hydrocarbon in intimate contact during the period the catalyst is being prepared. In the initial stage individual particles of aluminum halide appear to become coated with a layer of sticky complex and if the mixing power is not great enough such particles tend to accumulate and/or agglomerate to form a viscous mass which settles to the bottom of the reaction vessel and further formation of the desired complex is inhibited or prevented, since unreacted aluminum halide no longer has access to the hydrocarbon phase. While aluminum chloride is most generally used in such catalysts, other aluminum halides can also be used, particularly aluminum bromide. Aluminum fluoride generally does not give satisfactory results, but mixed halides such as AlCl$_2$F, AlClF$_2$, AlBr$_2$F, AlCl$_2$Br, AlClBr$_2$, and the like may often be used successfully. In subsequent discussion herein the invention will be discussed in connection with its specific application to catalysts comprising aluminum chloride, but it is to be understood that the principles and procedures so discussed can be applied to other catalysts comprising other volatile metal halides of the Friedel-Crafts type, such as iron chloride or bromide, zinc chloride, and the like.

It is an object of this invention to recover volatile metal halides of the Friedel-Crafts type from liquid organic materials containing the same.

Another object of our invention is to effect a recovery of a volatile metal halide from a hydrocarbon-metal halide complex having catalytic activity.

A further object of our invention is to recover a volatile aluminum halide from a liquid catalytic complex discharged from a hydrocarbon conversion.

Still another object of our invention is to recover aluminum chloride from the excess, or from a spent, hydrocarbon-aluminum chloride complex discharged from a hydrocarbon conversion such as an alkylation or an isomerization process.

Further objects and advantages of our invention will become apparent, to one skilled in the art, from the accompanying disclosure and discussion.

The recovery of anhydrous aluminum chloride from residues remaining from aluminum chloride conversion of hydrocarbons has long been a problem. In the old aluminum chloride cracking process, hydrocarbons and anhydrous aluminum chloride were heated in a still, the hydrocarbons cracked, and the light products removed. Further quantities of oil were charged and cracked until the catalyst lost its activity. At this time, the aluminum chloride usually was present in the still in a hard, carbonaceous residue termed in the art at that time as a "coky residue" or "aluminum chloride coke". This coke was then chipped out of the still and the aluminum chloride recovered by destructive distillation.

In conducting this destructive distillation, the residue was generally freed of hydrocarbon as far as possible by draining. This, of course, did not remove all the hydrocarbon material, so the drained residue was "coked," that is the remaining hydrocarbons decomposed, by heating to about 700° F., this operation being conducted with substantially no vaporization of aluminum chloride. This material was then heated to a temperature between about 950 and 1800° F., about 1450° F. being preferred. Thermal treatment alone results in 50 to 70 per cent recovery of the aluminum chloride, while the addition of chlorine to the distillation step increases recovery up to nearly complete recovery.

As previously discussed herein, one present-day method of utilizing aluminum chloride as a catalyst is in the form of a fluid aluminum chloride-hydrocarbon complex. In the conversion of hydrocarbons with this catalyst, the activity is maintained by addition of aluminum chloride as such. In the course of carrying out the reaction, the fortifying aluminum chloride reacts to form more complex. Thus, in a continuous system, aluminum chloride per se is added continuously and an equilibrium complex is withdrawn at such a rate that the volume of the catalytic material within the reaction zone remains constant. This equilibrium material so withdrawn contains aluminum chloride in substantially the same proportion as the catalytic material in the reaction zone, and thus, in that form the aluminum chloride cannot be directly utilized in the same reactor. Such a liquid catalytic material contains from about 50-55 to 65-70 per cent by weight of aluminum chloride, of which about 35 to about 45 per cent is bound with hydrocarbon material and the remaining 5 to 25 per cent is free and apparently dissolved and/or suspended in the complex. Treatment to recover the aluminum chloride at a higher level of activity, i. e. with more aluminum chloride in an unbound state, so that it can be used in the reaction zone from which it was withdrawn is therefore necessary.

The recovery of anhydrous aluminum chloride from such a fluid catalytic material presents different problems from recovery from the solid, coky residues of the cracking stills. For example, on heating the liquid catalytic material, the aluminum chloride begins to vaporize therefrom prior to the formation of a hard residue, or coke. In treating such a material discarded from an ethylene-isobutane alkylation system, about 50 per cent of the aluminum chloride distilled from the residue prior to the formation of the hard, coky residue. The formation of the hard residue appears to be a time and temperature effect, and the amount of aluminum chloride recovered prior to the formation of this hard residue is substantially constant, the proportion of the aluminum chloride recovered prior to the formation of the hard residue appearing to be a function of the state of degradation of the catalyst rather than the time and temperature of the treatment.

The aluminum chloride remaining in the hard residue is less readily recovered than that removable prior to the coking of the complex. The hard residue contains a high proportion of elementary carbon, and the aluminum chloride contained appears to be held by this carbon by adsorption. A carrier gas is helpful, therefore, in recovering the aluminum chloride from the hard residue.

It is advantageous to carry out the recovery operation in one vessel. In a retort of the usual design, however, the coky residue is difficult to remove if the destructive distillation is carried to such a point that high recovery of aluminum chloride is effected.

According to the present invention, the destructive distillation is carried out in a ball mill, rod mill, or tube mill. By the practice of this invention, the fluid complex is continuously added to one end of the mill and the hard residue formed from the fluid aluminum halide-hydrocarbon complex during the destructive distillation is continuously ground and broken up so that it is readily removed. Further, the sliding of the grinding elements, such as the balls or rods, across each other and on the surface of mill shell continuously breaks the coke loose from all the surfaces in contact with the complex being distilled as rapidly as it is formed. Thus, this invention allows continuous operation of the destructive distillation step, greatly simplifying the overall process with corresponding economic advantages.

In one preferred embodiment of our invention, the continuous addition of the metal halide-hydrocarbon fluid is effected by spraying it upwardly on the hot wall of the mill near the top. In this way a large portion of the metal halide is immediately vaporized and residual material is coked, with deposition of this coke on the wall of the mill. As the mill turns the coked-up wall is cleaned off by the action of the grinding elements in the mill, and the coke broken up to a form readily discharged from the mill. In some instances the fluid may be sprayed directly on the balls, or rods, which are the grinding elements in the mill. Simultaneous introduction of a stream of a hot gas aids materially the separation of aluminum chloride from the catalytic complex; it aids both the initial vaporization from the liquid sprayed into the mill and the separation from the residual tar and coke. Such a gas may be a material such as a hydrogen halide, nitrogen, hydrogen, or a low-boiling saturated hydrocarbon. It is often desirable to use a liquid volatile hydrocarbon, such as a butane, to quench the hot effluent, and the use of hot vapors of the same material simplifies subsequent separation steps.

Figure 2:
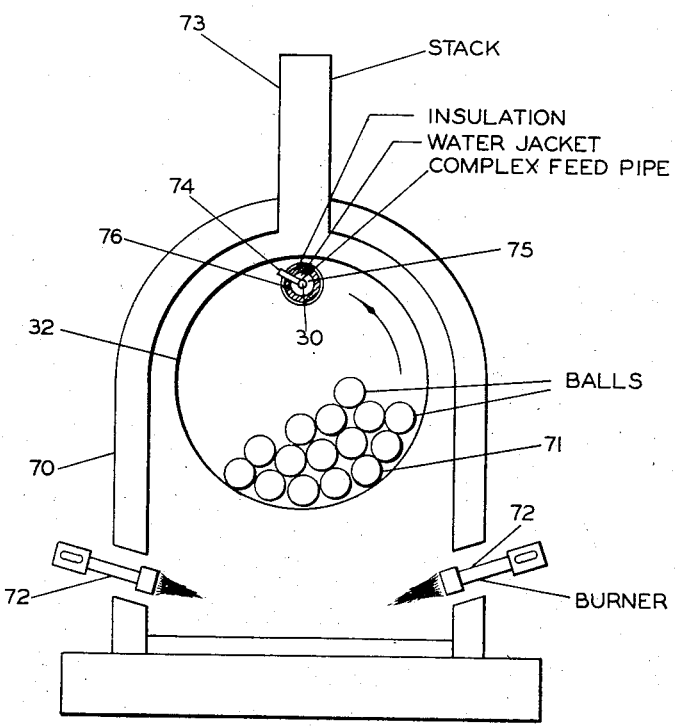

Further details of a preferred embodiment of the practice of our invention will now be discussed in connection with the accompanying drawings, which form a part of this specification. Figure 1 shows schematically, by means of a diagrammatic flow sheet, an arrangement of apparatus which includes not only the apparatus for the recovery of a volatile metal halide from the material discharged from a conversion system, which is shown partially in section, but also includes, briefly, the conversion system. Figure 2 is a schematic cross-section of a ball mill which is shown, longitudinally, in Figure 1.

With reference now to Figure 1, a hydrocarbon charge stream is introduced through line 10 to reactor 11. In the event alkylation is taking place in reactor 11, the hydrocarbon charge will comprise a desired alkylatable hydrocarbon, such as isobutane or benzene, and a desired alkylating reactant, such as ethylene or some other olefin, or such as an alkyl halide. In the event the reaction is one of isomerization this hydrocarbon charge may comprise substantially only one hydrocarbon species, such as normal butane or normal pentane. A catalyst comprising a hydrocarbon-metal halide complex, such as is more thoroughly discussed elsewhere herein, is introduced to reactor 11 through line 12. Reactor 11 will comprise one or more reaction chambers, together with mixing devices for maintaining an intimate admixture between reactants and liquid catalyst, and the various pumps, heaters or coolers, recirculation lines, surge tanks, and the like such as are well known to those skilled in the art. A mixture of unreacted hydrocarbons, reaction products and catalyst is passed through line 14 to separator 15. In this separator the liquid catalyst settles as a heavy liquid phase and the hydrocarbon mixture collects in the top portion, generally as a liquid. This hydrocarbon mixture is passed through line 16 to separation means 20, which will comprise necessary fractionating columns and associated equipment, and means for effecting desirable purification of products of the reaction carried out in reactor 11, such as alkali washers, chemical treaters for removing halogen compounds, and the like. One or more product fractions may be recovered, as through lines 21 and 22. Unreacted materials may be recycled as desired, as through line 23.

A liquid hydrocarbon-metal halide complex catalyst, which settles out in separator 15, is withdrawn through line 25 and at least a substantial portion thereof is passed to line 12 and reactor 11. As has been previously discussed herein, it is generally necessary to fortify this catalyst by continuous or periodic addition of fresh metal halide. Such addition is diagrammatically illustrated by line 26 which enters line 12. Such fortification of the catalyst has also an effect of increasing the volume of the catalyst in the system. In order to keep the volume within desired limits, a portion thereof is removed from line 25 through line 27 to storage vessel 28. It is often desirable to allow a volume of catalyst to build up in storage vessel 28 approximately equal to the volume of catalyst used in the reaction system so that, if for any reason the catalyst in use becomes poisoned, the catalyst may be readily and easily dumped (through means not shown) and a supply of active catalyst is available for immediate introduction into the system. When using a liquid hydrocarbon-aluminum chloride catalyst containing 55 to 60 per cent of free and combined aluminum chloride for the alkylation of isobutane with ethylene, it has been found that such excess catalyst may be stored for several months at ordinary temperatures without appreciable deterioration in catalyst activity and without appreciable increase in viscosity. Such a catalyst will normally have a viscosity of less than 200 centistokes at 100° F. In such a storage of this catalyst it is desirable to maintain a layer of paraffinic hydrocarbon over the catalyst to protect it from the adverse effects of the atmosphere.

The liquid catalytic material can be withdrawn from the system either directly from line 25 through line 30 or from storage vessel 28 through line 31 and passed to mill 32. Depending upon the amount of the material to be treated, this ball mill may have a diameter of from about 1 to about 3 or 4 feet and have a length of from about 5 to 15 or 20 feet. In one commercial plant for producing about 70,000 gallons of an alkylation product a day in reactor 11, it is found 40 to 50 gallons per hour of liquid hydrocarbon-aluminum chloride complex are produced, and that a ball mill about 2.5 feet in diameter and 15 feet long is large enough to handle this material. Such a ball mill is preferably rotated at a low speed, such as about 5 to 10 R. P. M., and will be maintained in a suitable furnace, not shown in Figure 1 but diagrammatically indicated in Figure 2. This ball mill is preferably operated at a temperature above 500° F. and more preferably between about 700 and about 1000° F. While the liquid hydrocarbon-catalyst complex may be heated before its introduction into the ball mill, it is preferred that such heating, if any, be at a temperature appreciably below the operation of the ball mill to avoid extensive and premature chemical reaction within this material prior to its introduction into the mill. While the liquid may be introduced in any manner, a more desirable operation is to spray the liquid into the mill, preferably in a direction which is normal to the axis of the mill. Such a spray may be either against the walls of the mill in the upper portion, as indicated diagrammatically in Figures 1 and 2, or upon the tumbling mass of balls at that end of the mill, with the former method of introduction being preferred. Hot vapors or a gas can be simultaneously introduced through line 33. Such a gas may be any suitable material as hereinbefore discussed, and as also previously discussed it is preferred that it be a hydrocarbon material, such as butane. If desired a portion of the material may be introduced directly into line 30 through line 34. When a gas such as butane is used, an amount equivalent to between about 1 and about 10 volumes of the liquid hydrocarbon (under normal conditions per volume of liquid complex is preferred.

Balls of any suitable size may be used in the mill and, if the mill is not too long, rods may be used instead of balls. The purpose of these balls is to grind up coke which is formed by the decomposition of the catalyst complex so that it will be carried out of the mill along with the vaporous effluents through line 35. The size of the balls will depend upon the size of the mill, particularly its diameter, and upon the fineness of the coke desired. It is preferred that these coke particles be larger than 10 microns, still more preferably larger than 20 microns, and satisfactory operation will not be realized if they have a diameter greater than about 0.25 inch. These results can be obtained with balls having a diameter of about 2 to about 4 inches or with rods having a diameter of about 0.5 to about 2 inches. When using either balls or rods small as well as large diameter elements can be used at the same time. It is generally desirable to construct the mill and the balls of material which is resistant both to erosion and corrosion of the material being treated. High nickel steels and commercial alloys such as "Hastalloy B," "Inconel" and "Niresist" are particularly resistant to the corrosive action of the materials treated. It is preferred to use metallic balls or rods rather than those made of ceramic materials since it is important to get a high heat transfer rate from the outside of the mill to the materials being treated inside.

It has been found that at about 500° F. a reaction time of from about 6 to about 24 hours is necessary to effect satisfactory liberation of the metal halide and coking of the residual organic material. At 700° F. the time has decreased to less than 2 hours and preferred operation is above this temperature, although it is not necessary to go above about 1000° F. Higher temperatures also have the advantage that a more friable coke can be obtained which is ground more finely in the mill with correspondingly greater recovery of metal halide.

Effluents of the mill comprising hydrocarbon vapors and comminuted coke pass through outlet 35 to coke separator 36, preferably without substantial reduction in temperature. Coke separator 36 is a large chamber wherein the bulk of the coke settles out. This comminuted coke can be discharged through line 37. It will contain an appreciable proportion, such as 10 to 30 per cent, of metal halide, although this metal halide will be not more than 5 to 25 per cent of that introduced through line 30 into the mill, since much of the organic material will be decomposed to low-boiling material present in the effluents as gases or vapors. The coke separator may have one or more baffles in the top to aid in separating finely divided coke from the stream of gaseous material. Gases substantially free from coke pass from separator 36 through line 40 to condenser 41 surrounded by a cooling jacket 42 and provided with a scraper 43. An initial lowering of the temperature may be effected by supplying quenching liquid through line 45, such as cool liquid butane. Condenser 42 and separator 44 connected below it should be maintained at a temperature such that the vapor pressure of the metal halide is, at most, not greater than a few millimeters of mercury. Where aluminum chloride is the metal halide concerned, a temperature below 150° F. is satisfactory. Metal halide is discharged through line 46 and may be returned to reactor 11 as by being introduced into the liquid hydrocarbon-metal halide complex circulating through line 25. Where the metal halide is solid under the conditions of condensation present in condenser 42, as aluminum chloride normally will be, operation of scraper 43 is necessary to keep a deposit of solid material from building up on the inside walls of the condenser. As will be appreciated, such a scraper should have a slightly curved shape so that it not only scrapes the walls free but directs the solid material down into separator 44.

Under these conditions the metal halide will be substantially free from organic material, although at times it may contain about 1 to 5 per cent by weight of such material. If desired, a solid metal halide which contains too much contaminating material may be washed with a liquid low-boiling paraffin hydrocarbon, such as liquid butane, to effect a further purification.

Vaporous material is removed from the top of condenser 42 through line 50. In the event a hydrocarbon material is introduced to mill 32 through line 33, this vaporous material will comprise essentially hydrocarbons together with a minor amount of hydrogen. In any event, the vaporous material passing through line 50 will contain a substantial proportion of hydrocarbons which will have been produced by decomposition reactions in mill 32. These vapors may be returned, entirely or in part, to mill 32 or may be discharged entirely or in part through line 51. A direct return of such vapors is effected by passing them through line 52, heater 53 and reintroducing them into line 33. It will generally be desirable to effect a removal of undesired constituents from these vapors, in which event they may be passed entirely or in part through line 55 to separating means 56. Separating means 56 will comprise fractional distillation columns and such associated equipment as one skilled in the art will find desirable or necessary to effect a suitable separation. Light gases can be discharged through line 57 and heavier products can be discharged through lines 58 and 59. A purified recycle material can be returned to line 52 through line 60. As has been previously indicated, it will often be found desirable to use butane both as a quench medium through line 45 and as a vaporous material through line 33. When this material comprises a high concentration of normal butane an appreciable amount of isomerization may be effected in mill 32 and subsequent equipment, in which instance isobutane may be recovered from separation means 56 as a desirable by-product. Make-up butane can be added through line 61. A portion of the material passing through line 52 may be diverted through line 62 and cooler 63 for introduction into the system through line 45 as a quench. The temperature of the material heated in heater 53 and passed to mill 32 through line 33 may be from about 300° F. to about 100 or 200° F. above the temperature of the interior of the mill 32. It is preferred that this gas be near, or above, the interior temperature of mill 32 to facilitate an initial vaporization of metal halide from the liquid material sprayed into the mill before it decomposes into a coky material.

With reference now more particularly to Figure 2, mill 32 is suitably supported in a furnace 70 and contains a quantity of balls 71. The furnace is heated by a number of burners 72 with discharge of products of combustion through stack 73. The liquid hydrocarbon-metal halide complex is introduced through line 30, which terminates in one or more nozzles 74. Line 30 is preferably surrounded by a water jacket 75 and insulation 76, so that the liquid complex will not be heated to too high a temperature before it leaves nozzle 74, as previously discussed.

It will be appreciated that each of Figures 1 and 2 is diagrammatic. Various specific pieces of equipment, such as reaction contactors, fractional distillation columns, pumps, control valves, surge tanks, accumulators, heaters and coolers, and the like are well known to those skilled in the art and specific equipment can be readily assembled for any specific application of our invention by one so skilled by following the teachings contained herein. It will also be appreciated

We claim:

1. An improved process of recovering aluminum chloride from a liquid hydrocarbon-aluminum chloride complex, which comprises continuously passing a stream of such a liquid into a decomposition zone maintained at a temperature not greater than about 1000° F. and sufficient to effect a decomposition of said liquid, simultaneously and concurrently introducing a stream of gaseous butane into said zone at a temperature approximating said decomposition temperature, effecting within said zone a continuous grinding of solid products resulting from decomposition of said liquid, removing from said zone through a common discharge means resulting vapors and comminuted solid material, separating said comminuted solid from said effluents without substantially reducing the temperature thereof, admixing with resulting solid-free vapors liquid butane and thereby reducing the temperature of the resulting mixture below about 150° F., separating from said mixture solid aluminum chloride so formed, recycling at least a part of the remaining material to said decomposition zone as a portion of said gaseous butane, and cooling and condensing a further part of the remaining material and using same as a portion of said liquid butane.

2. An improved process of recovering metal halide from a liquid hydrocarbon-metal halide complex, which comprises continuously passing a stream of such a liquid into a decomposition zone maintained at a temperature not greater than about 1000° F. and sufficient to effect a decomposition of said liquid, simultaneously and concurrently introducing a stream of gaseous liquefiable volatile saturated hydrocarbon into said zone at a temperature approximating said decomposition temperature, effecting within said zone a continuous grinding of solid products resulting from decomposition of said liquid, removing from said zone through a common discharge means resulting vapors and comminuted solid material, separating said comminuted solid from said effluents without substantially reducing the temperature thereof, admixing with resulting solid-free vapors a liquid stream of a liquefiable volatile saturated hydrocarbon to reduce the temperature of the resulting mixture below about 150° F., separating from said mixture solid metal halide so formed, recycling at least a part of the remaining material to said decomposition zone as a portion of said gaseous saturated hydrocarbon, and cooling and condensing a further part of the remaining material and using same as a portion of said liquid saturated hydrocarbon.

3. An improved process of recovering aluminum chloride from a liquid hydrocarbon-aluminum chloride complex, which comprises continuously passing a stream of such a liquid into a decomposition zone maintained at a temperature not greater than about 1000° F. and sufficient to effect a decomposition of said liquid, simultaneously and concurrently introducing a stream of gaseous liquefiable volatile saturated hydrocarbon into said zone at a temperature approximating said decomposition temperature, effecting within said zone a continuous grinding of solid products resulting from decomposition of said liquid, removing from said zone through a common discharge means resulting vapors and comminuted solid material, separating said comminuted solid from said effluents without substantially reducing the temperature thereof, admixing with resulting solid-free vapors a liquid stream of a liquefiable volatile saturated hydrocarbon and reducing the temperature of the resulting mixture below about 150° F., separating from said mixture solid aluminum chloride so formed, recycling at least a part of the remaining material to said decomposition zone as a portion of said gaseous saturated hydrocarbon and cooling and condensing a further part of the remaining material and using same as a portion of said saturated hydrocarbon.

4. An improved process for recovering aluminum chloride from a liquid catalytic material comprising a liquid hydrocarbon-aluminum chloride complex and associated free aluminum chloride, which comprises passing a stream of such a liquid at a temperature such that it is chemically stable into one end of a long decomposition zone maintained at a decomposition temperature between 500 and 1000° F., said zone comprising a horizontal cylinder rotatable about its axis and containing free grinding elements, supplying heat to said zone through the walls of said cylinder, rotating said cylinder and spraying said liquid stream directly against the hot wall of said cylinder in the upper part of said zone and in the direction of rotation of said cylinder, introducing into the same end of said zone a gaseous material at a temperature between 100 and 300° F. above said decomposition temperature, said free aluminum chloride being rapidly vaporized and said complex being decomposed to form coke directly on the wall of said rotating cylinder and additional free aluminum chloride, effecting within said zone a grinding of said coke to particles having diameters between 10 microns and 0.25 inch, removing from said zone at the other end thereof through a common discharge means resulting vapors and comminuted coke, maintaining said discharged coke and vapors within said temperature range of 500 to 1000° F. and separating said comminuted coke from said vapors, and subsequently cooling resulting coke-free vapors and recovering aluminum chloride therefrom.

HAROLD J. HEPP.
HOWARD R. SAILORS.

REFERENCES CITED

The following references are of record in the file of this patent:

UNITED STATES PATENTS

| Number | Name | Date |
| --- | --- | --- |
| 1,296,367 | Cochran | Mar. 4, 1919 |
| 1,582,131 | Danner | Apr. 27, 1926 |
| 1,955,272 | Carl | Apr. 17, 1934 |
| 2,348,408 | Page | May 9, 1944 |
| 2,393,569 | Ross et al. | Jan. 22, 1946 |

FOREIGN PATENTS

| Number | Country | Date |
| --- | --- | --- |
| 192,106 | Great Britain | Jan. 22, 1923 |